United States Patent
Takeshita et al.

(10) Patent No.: US 9,902,359 B2
(45) Date of Patent: Feb. 27, 2018

(54) AIRBAG APPARATUS

(71) Applicant: MAZDA MOTOR CORPORATION, Hiroshima (JP)

(72) Inventors: Hiroaki Takeshita, Aki-gun (JP); Takashi Nagatani, Hiroshima (JP); Motoharu Hirata, Hatsukaichi (JP); Mitsutoshi Yamanishi, Higashihiroshima (JP); Motoharu Sato, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/046,904

(22) Filed: Feb. 18, 2016

(65) Prior Publication Data

US 2016/0244016 A1 Aug. 25, 2016

(30) Foreign Application Priority Data

Feb. 24, 2015 (JP) .................................. 2015-034412

(51) Int. Cl.
*B60R 21/206* (2011.01)
*B60R 21/231* (2011.01)
(Continued)

(52) U.S. Cl.
CPC .......... *B60R 21/203* (2013.01); *B60R 21/206* (2013.01); *B60R 21/231* (2013.01);
(Continued)

(58) Field of Classification Search
CPC ... B60R 21/205; B60R 21/206; B60R 21/233; B60R 21/231; B60R 21/2338;
(Continued)

(56) References Cited

U.S. PATENT DOCUMENTS 6,039,380 A * 3/2000 Heilig ..................... B60R 21/02
280/752
6,435,554 B1 * 8/2002 Feldman ............... B60R 21/206
280/730.1
(Continued)

FOREIGN PATENT DOCUMENTS

CN 1521060 A 8/2004
CN 103802780 A 5/2014
(Continued)

OTHER PUBLICATIONS

JPO Office Action from corresponding JP 2015-034412, dated Oct. 4, 2016, with machine translation, 6pp.
An Office Action issued by Chinese Patent Office dated Sep. 4, 2017, which corresponds to Chinese Patent Application No. 201610096236.9 and is related to U.S. Appl. No. 15/046,904; with its English summary.

*Primary Examiner* — Keith J Frisby
(74) *Attorney, Agent, or Firm* — Studebaker & Brackett PC

(57) ABSTRACT

Disclosed is an airbag apparatus which comprises: a first airbag configured to be deployed rearwardly from a steering wheel during an oblique collision of a vehicle; and a second airbag configured to be deployed rearwardly and upwardly from a position below a steering shaft during the oblique collision of the vehicle. The second airbag comprises an upward deployment portion capable of, in its deployed state, extending upwardly via a lateral side of the steering shaft, wherein the upward deployment portion is disposed between a lateral portion of the first airbag in its deployed state and an instrument panel.

9 Claims, 12 Drawing Sheets

(51) Int. Cl.
*B60R 21/2338* (2011.01)
*B60R 21/203* (2006.01)
*B60R 21/233* (2006.01)
*B60R 21/00* (2006.01)
*B60R 21/16* (2006.01)

(52) U.S. Cl.
CPC ........ *B60R 21/233* (2013.01); *B60R 21/2338* (2013.01); *B60R 2021/0009* (2013.01); *B60R 2021/0051* (2013.01); *B60R 2021/161* (2013.01); *B60R 2021/23107* (2013.01); *B60R 2021/23169* (2013.01); *B60R 2021/23308* (2013.01); *B60R 2021/23386* (2013.01)

(58) Field of Classification Search
CPC ........... B60R 2021/23169; B60R 2021/23386; B60R 2021/23107; B60R 2021/23308; B60R 2021/0009; B60R 2021/0051; B60R 2021/161
USPC ................ 280/730.1, 732, 729, 743.1, 743.2
See application file for complete search history.

(56) References Cited

U.S. PATENT DOCUMENTS

| | | | |
|---|---|---|---|
| 7,549,671 B2* | 6/2009 | Mizuno | B60R 21/206 180/271 |
| 2003/0116945 A1 | 6/2003 | Abe | |
| 2004/0174003 A1 | 9/2004 | Dominissini | |
| 2009/0115172 A1* | 5/2009 | Fukawatase | B60R 21/206 280/737 |
| 2011/0175334 A1* | 7/2011 | Miller | B60R 21/206 280/730.2 |
| 2017/0072892 A1 | 3/2017 | Wang et al. | |

FOREIGN PATENT DOCUMENTS

| | | |
|---|---|---|
| JP | 09-104317 | 4/1997 |
| JP | 09-123862 | 5/1997 |
| JP | 2003-182500 | 7/2003 |
| JP | 2008-044594 A | 2/2008 |
| JP | 2013-133049 A | 7/2013 |

* cited by examiner

AIRBAG APPARATUS

TECHNICAL FIELD

The present invention relates to an airbag apparatus for protecting an occupant upon an oblique collision of a vehicle.

BACKGROUND ART

In the event of an oblique collision accident in which an opponent object collides with an own vehicle obliquely from a front end of the vehicle, an occupant is pushed and moved obliquely forwardly from his/her initial position (seated position). With a view to protecting an occupant in the event of such an oblique collision accident, there has heretofore been employed a technique of deploying airbags from both front and lateral sides of the occupant.

For example, a vehicle disclosed in JP 2013-133049A (hereinafter referred to as "Patent Literature 1") is equipped with a front airbag configured to be deployed rearwardly from an instrument panel disposed at a front end of a passenger compartment, and a side airbag configured to be deployed downwardly from a lateral edge portion (a pillar or a roof side rail) of an upper wall of the passenger compartment. In the above airbag apparatus disclosed in the Patent Literature 1, even in a situation where an occupant is pushed and moved obliquely forwardly due to an oblique collision, the front airbag and the side airbag can receive a head region of the occupant to achieve protection of the occupant.

Further, with a view to protecting an occupant using only a front airbag during an oblique collision, there has also been invented a technique of deploying the front airbag to form a bilaterally asymmetric configuration. Heretofore-known examples thereof include JP 2008-044594A (hereinafter referred to as "Patent Literature 2"). Specifically, an airbag apparatus disclosed in the Patent Literature 2 comprises an airbag configured to be deployed rearwardly from an instrument panel toward an occupant, a pair of locking members disengageably engageable with respect to right and left tethers provided inside the airbag, and an actuator configured to drive the pair of locking members individually, depending on a type of vehicle collision. The actuator is operable, upon detection of an oblique collision of a vehicle, to drive only one of the pair of locking members in such a manner as to release a locked state of one of the tethers closer to an opponent object and maintain a locked state of the other tether farther away from the opponent object. Thus, the front airbag is deployed such that a lateral portion thereof closer to the opponent object is inflated rearwardly to a larger extent than a lateral portion thereof farther away from the opponent object, so that it becomes possible to protect an occupant (who is pushed and moved toward a side closer to the opponent object, under an impact during the oblique collision) by the rearwardly largely inflated portion.

However, the airbag apparatus disclosed in the Patent Literature 1 is likely to fail to adequately receive (sufficiently restrain) an occupant on a case-by-case basis. For example, it is assumed that, when a head region of the occupant hits against the front airbag in an obliquely forward direction, the front airbag is deformed such that a rear surface thereof largely inclines in response to an obliquely forwardly-oriented load input from the occupant's head region to the front airbag. Once such a deformation occurs, the occupant's head region is more likely to be displaced laterally along the rear surface of the front airbag (i.e., displaced from a central region to a peripheral edge region of the front airbag), leading to a risk that the front airbag becomes unable to receive the occupant's head region with a sufficient force, resulting in failing to achieve adequate protection of the occupant.

The airbag apparatus disclosed in the Patent Literature 2 has a potential to prevent the lateral displacement of the occupant's head region because the airbag is deployed to form a bilaterally asymmetric configuration. However, in order to deploy the airbag to form in a bilaterally asymmetric configuration (selectively restrain either one of the right and left tethers), it is necessary to select either one of the right and left locking members and drive the selected locking member at an appropriate timing. In other word, if the drive timing is deviated even just slightly, it becomes impossible to realize an intended bilaterally asymmetric configuration. Thus, there remains a need for improvement in terms of certainty of the protection. Moreover, the lateral portion of the airbag closer to the opponent object needs to be largely inflated rearwardly, and accordingly an internal volume of the airbag is increased, so that a time required for deployment becomes longer, leading to a risk of becoming unable to adequately protect an occupant.

SUMMARY OF INVENTION

The present invention has been made in view of the above circumstances, and an object thereof is to provide an airbag apparatus capable of adequately protect an occupant during an oblique collision of a vehicle.

In order to achieve the above object, the present invention provides an airbag apparatus for use in a vehicle to protect an occupant, wherein the vehicle includes an instrument panel and a steering wheel provided on a rear side of the instrument panel. The airbag apparatus comprises: a first airbag provided in the steering wheel and configured to be deployed rearwardly from the steering wheel during an oblique collision of the vehicle; and a second airbag provided at a position below a steering shaft extending forwardly from the steering wheel, and configured to be deployed rearwardly and upwardly from the position during the oblique collision of the vehicle. The second airbag comprises an upward deployment portion capable of, in its deployed state, extending upwardly via a lateral side of the steering shaft, wherein the upward deployment portion is disposed between a lateral portion of the first airbag in its deployed state and the instrument panel.

BRIEF DESCRIPTION OF DRAWINGS

FIGS. 5A and 5B are explanatory diagrams illustrating a structure of a driver airbag, wherein FIG. 5A is a rear view, and FIG. 5B is a sectional view taken along the arrowed line a-a in FIG. 5A.

DESCRIPTION OF EMBODIMENTS

Figure 1:
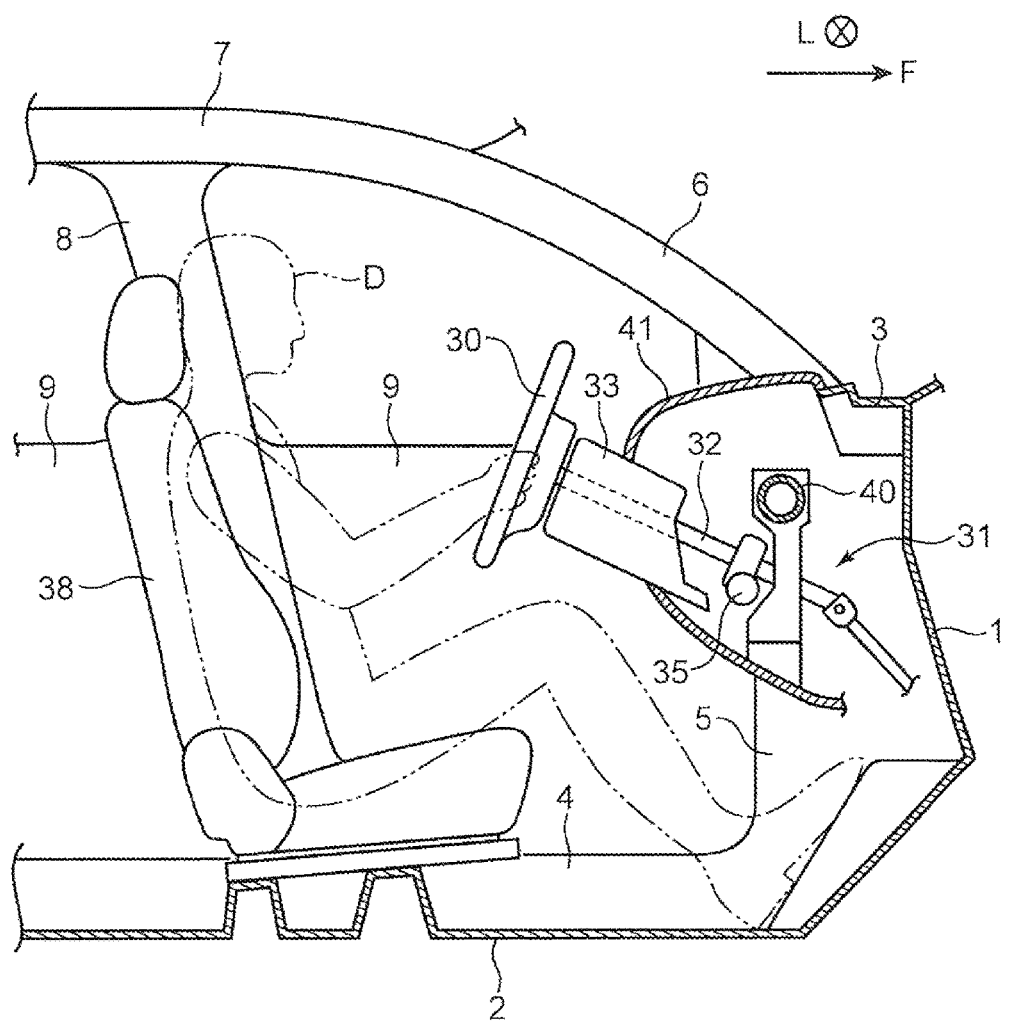
FIG. 1 is a side view depicting an inside of a passenger compartment of a vehicle using an airbag apparatus according to one embodiment of the present invention.
Figure 2:
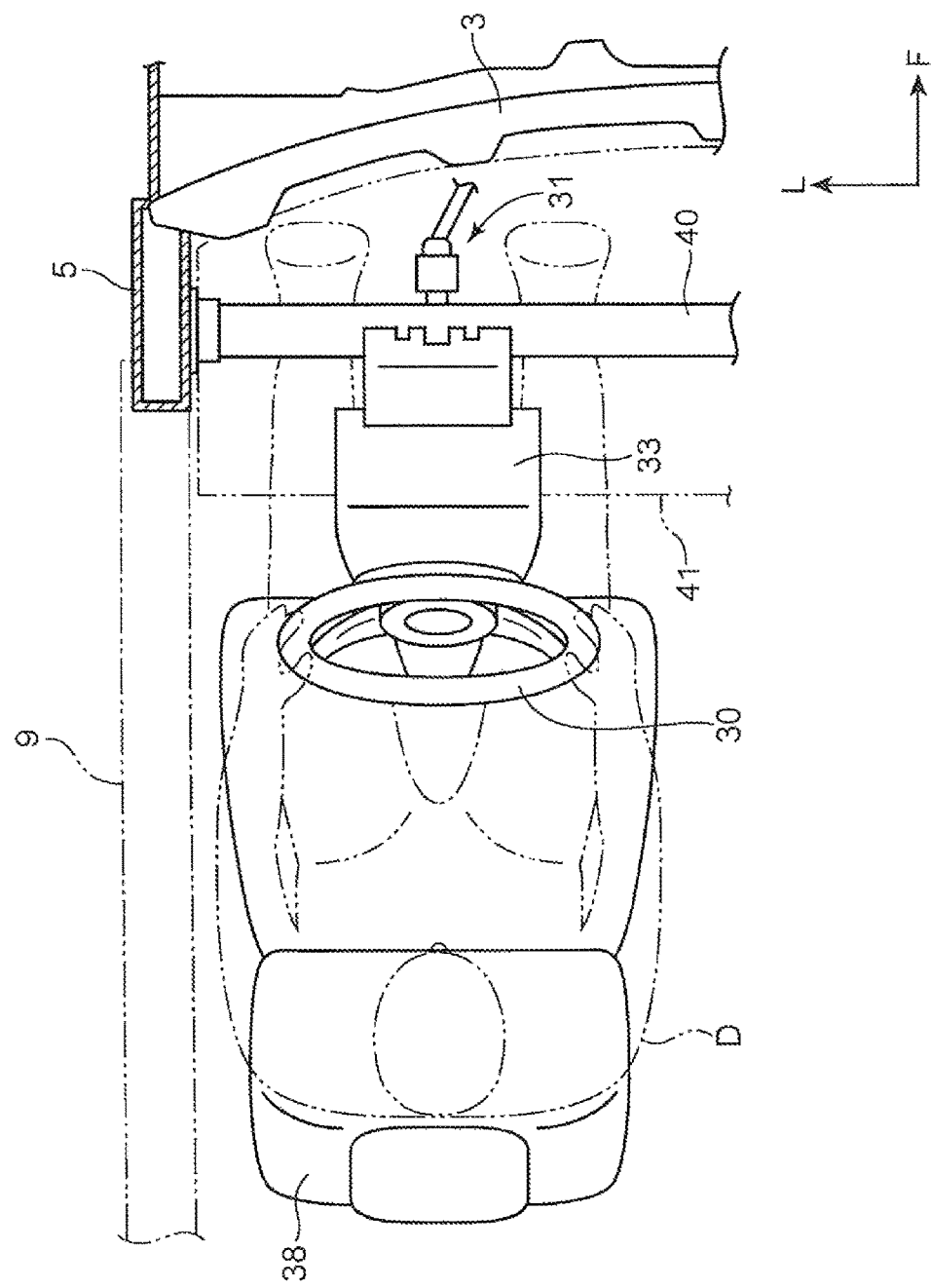
FIG. 2 is a top plan view of the inside of the passenger compartment.

FIGS. 1 and 2 depict an internal structure of a passenger compartment of a vehicle using an airbag apparatus according to one embodiment of the present invention. It should be noted that, although the side view of FIG. 1 depicts only a left side wall of the passenger compartment, a right side wall of the passenger compartment has a similar structure. In FIGS. 1 and 2, the arrow F indicates a forward direction of the vehicle, and the arrow L indicates a leftward direction of the vehicle (In other words, a side opposite to the arrow F is a rearward direction, and a side opposite to the arrow L is a rightward direction). The same applies to the aftermentioned figures.

As mainly depicted in FIG. 1, the vehicle in this embodiment comprises; a dash panel 1 partitioning between an engine compartment and the passenger compartment; a floor panel 2 extending rearwardly from a lower edge of the dash panel 1; a cowl panel 3 provided along an upper edge of the dash panel 1; a pair of right and left side-sills 4 extending in a front-rear (longitudinal) direction along respective right and left lateral edges of the floor panel 2; a pair of right and left hinge pillars 5 extending upwardly from respective front ends of the right and left side-sills 4; a pair of right and left front pillars 6 extending rearwardly and obliquely upwardly from respective upper ends of the right and left hinge pillars 5; a pair of right and left roof side rails 7 extending rearwardly from respective upper ends of the right and left front pillars 6; a pair of right and left center pillars 8 extending in an up-down direction in such a manner as to couple respective longitudinally central portions of the right and left roof side rails 7 to corresponding ones of the right and left side-sills 4; and a plurality of side doors 9 configured to openably and closably cover a plurality of door openings defined, respectively, on front and rear sides of the right and left center pillars 8.

The passenger compartment has a front end provided with an instrument panel 41 for mounting thereto various meters (vehicle speed meter, engine speed meter, etc.) and various on-vehicle devices (air conditioner, audio device, etc.). The instrument panel 41 is supported by an instrument panel member 40 provided inside the instrument panel 41. The instrument panel member 40 is composed of a pipe member extending in a vehicle width (lateral) direction, and opposite ends thereof are joined, respectively, to the right and left hinge pillars 5.

The floor panel 2 has an upper surface on which a driver seat 38 is mounted to allow a driver (occupant of the driver seat) D to be seated therein. Then, in front of the driver seat 38, a steering wheel 30 configured to be gripped and operated by the driver D is provided. It should be noted that the vehicle in this embodiment is produced as so-called "left-hand drive vehicle". Thus, the driver seat 38 and the steering wheel 30 are provided at positions offset leftwardly with respect to a vehicle width directional center of the passenger compartment.

The steering wheel 30 is supported by the instrument panel member 40 via a steering wheel support mechanism 31. Specifically, the steering wheel support mechanism 31 comprises: a steering shaft 32 extending from the steering wheel 30 forwardly and obliquely downwardly; a steering column 33 provided to wrap a rear portion of steering shaft 32; and an electric steering assisting mechanism 35 (electric power steering) interlocked with the steering shaft 32.

Figure 3:
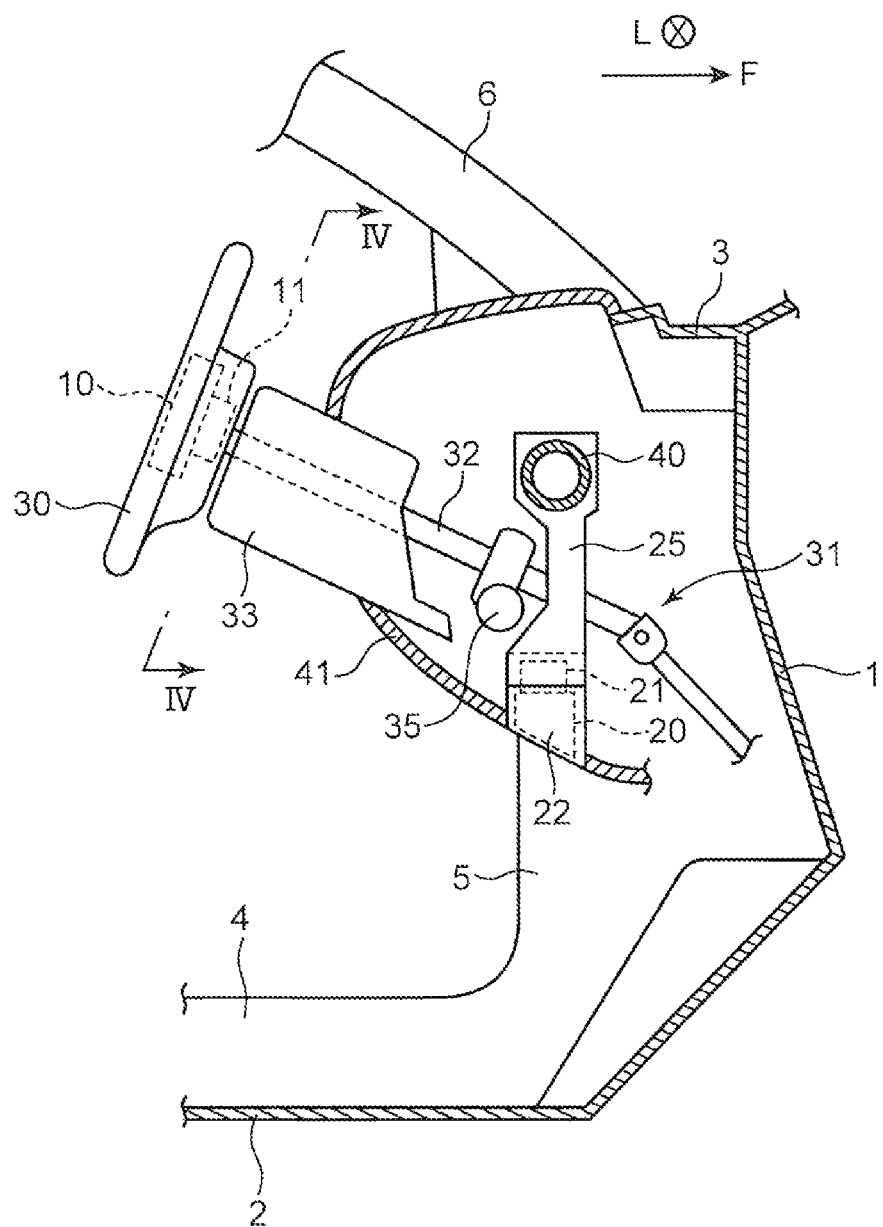
FIG. 3 is a side view depicting a part of FIG. 1 in an enlarged manner.
Figure 4:
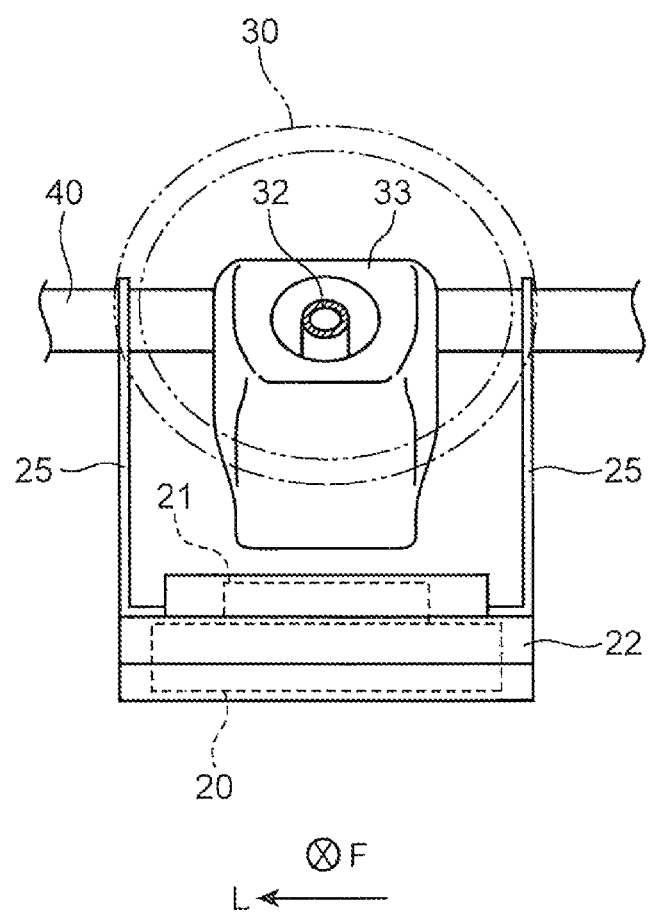
FIG. 4 is a rear sectional view depicting an installation structure of a knee airbag.

FIG. 3 is a side view depicting a part of FIG. 1 in an enlarged manner, and FIG. 4 is a rear sectional view when viewed forwardly from a position indicated by the line IV-IV in FIG. 3. As depicted in these figures, the steering wheel 30 is internally provided with a driver airbag 10, and an inflator 11 for supplying inflation gas to the driver airbag 10. Further, a knee airbag 20 and an inflator 21 for supplying inflation gas to the knee airbag 20 are provided at positions below the steering shaft 32. The driver airbag 10 is equivalent to "first airbag" set forth in the appended claims, and the knee airbag 20 is equivalent to "second airbag" set forth in the appended claims.

The driver airbag 10 is a bag-like member formed of a flexible material such as cloth, and is housed inside the steering wheel 30 in a compactly folded state. The inflator 11 is configured to be activated in the event of a frontal collision in which an opponent object (another vehicle or an obstacle) collides with the vehicle (own vehicle) from a front end of the vehicle, or an oblique collision in which an opponent object collides with the vehicle obliquely from the front end of the vehicle, and instantaneously supply inflation gas to the driver airbag 10. The driver airbag 10 is configured such that, in response to receiving the supply of inflation gas, it is inflated and deployed rearwardly from the steering wheel 30 (see FIGS. 5A, 5B, 6 and 7).

Figure 5A:
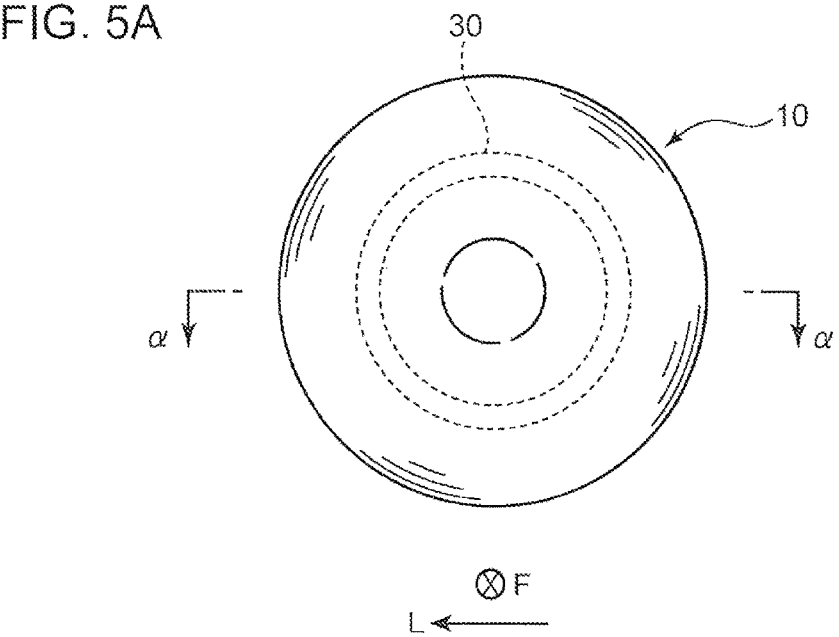
Figure 5B:
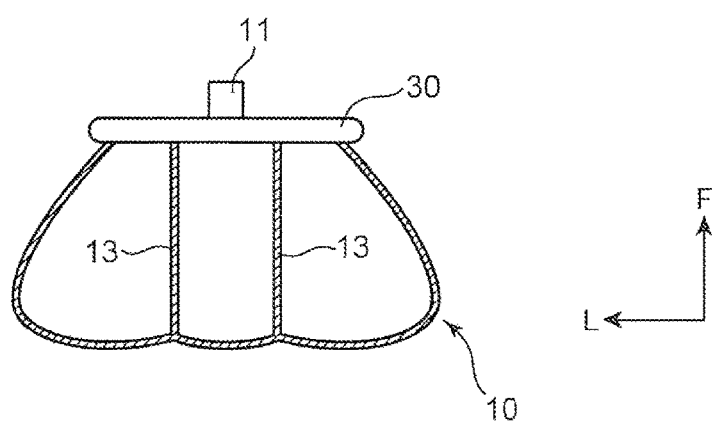

FIGS. 5A and 5B are, respectively, a rear view and a sectional view depicting a deployed state of the driver airbag 10. As depicted in these figures, the driver airbag 10 is formed in an approximately conical shape in cross-section, in its deployed state. The driver airbag 10 comprises a tether 13 dividing an internal space thereof into a plurality of compartments. In the depicted embodiment, the tether 13 is attached to connect an outer skin of the driver airbag 10 and the steering wheel 30 together in the front-rear detection. This tether 13 serves as a means to restrict an amount of deployment of a central portion of the driver airbag 10, so that a rear surface of the driver airbag 10 (a surface of the driver airbag 10 opposed to the driver D) in its deployed state is formed in a shape relatively close to a flat surface (circular plate shape) as a whole, instead of a rearwardly-convexed spherical surface. This makes it possible to receive a head region of the driver D by a relatively large surface, thereby leading to more adequate protection of the driver D.

The knee airbag 20 is a bag-like member formed of a flexible material such as cloth, and is housed inside a casing 22 provided on a lower wall of the instrument panel 41 in a compactly folded state (see FIGS. 3 and 4). Specifically, a pair of right and left brackets 25 are installed inside the instrument panel in such a manner as to extend downwardly from respective two positions of the instrument panel member 40 offset rightwardly and leftwardly with respect to the steering shaft 32, toward the lower wall of the instrument panel 41, and the casing 22 for housing the knee airbag 20 is fixed between lower ends of the pair of right and left brackets 25. The inflator 21 is configured to be activated in the event of a frontal or oblique collision of the vehicle, and instantaneously supply inflation gas to the knee airbag 20. The knee airbag 20 is configured such that, in response to receiving the supply of inflation gas, it is inflated and deployed rearwardly and upwardly along a lower surface and a rear surface of the instrument panel 41 (see FIGS. 6 and 7).

Figure 6:
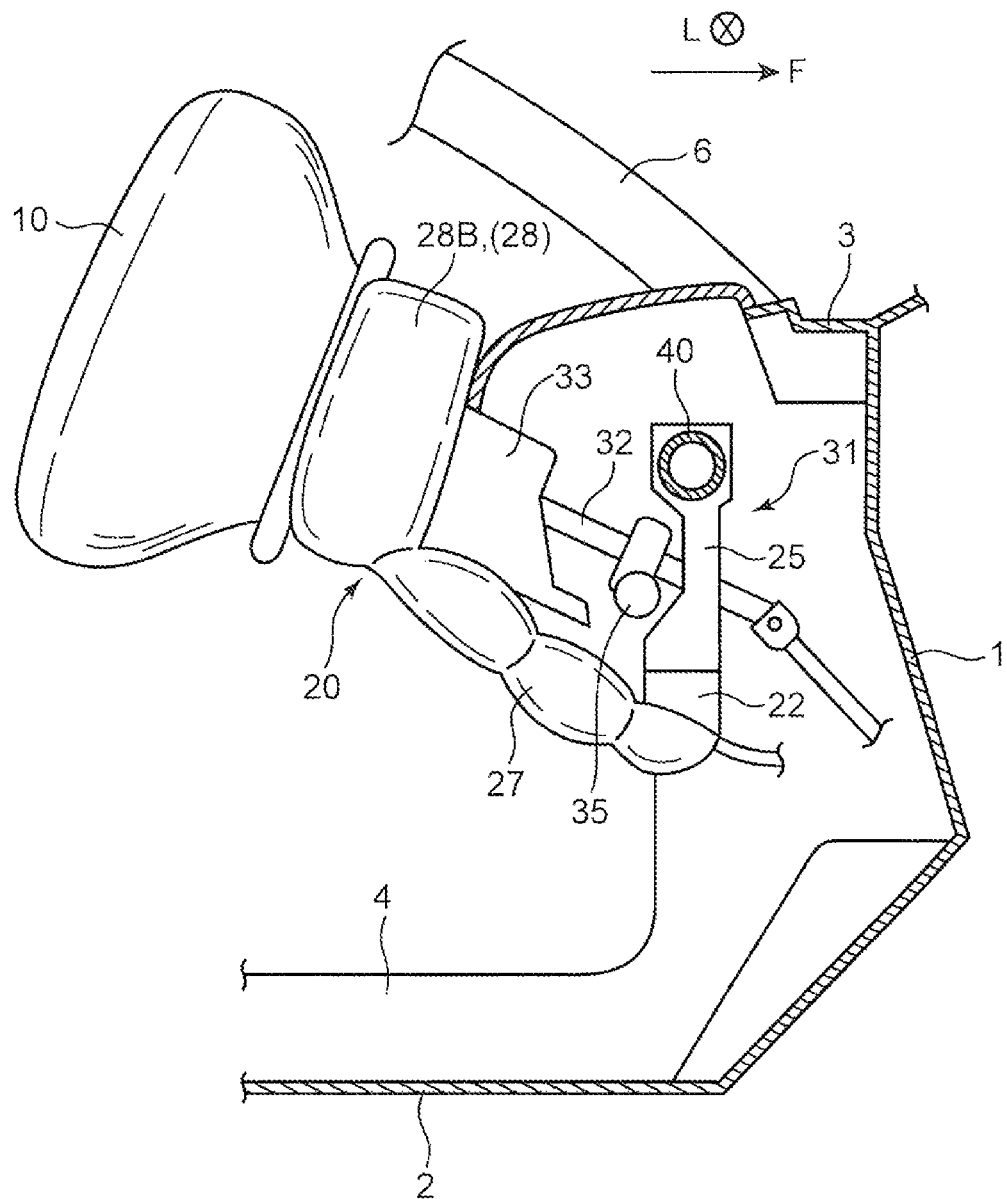
FIG. 6 is a side view depicting respective deployed states of the driver airbag and the knee airbag.
Figure 7:
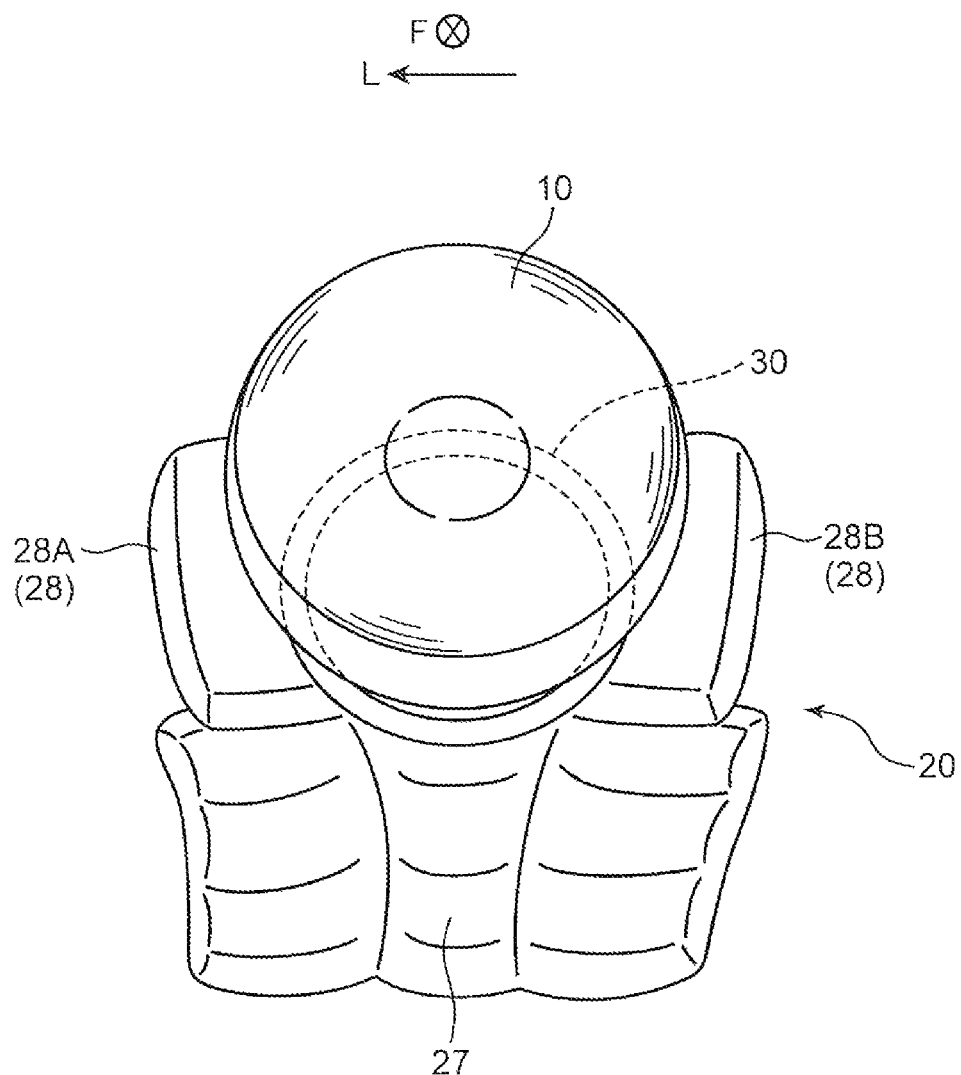
FIG. 7 is a rear view corresponding to FIG. 6.

FIGS. 6 and 7 are, respectively, a side view and a rear view depicting respective deployed states of the driver airbag 10 and the knee airbag 20. As depicted in these figures, the knee airbag 20 comprises a knee protection portion 27 capable of being spread in its deployed state to cover the lower surface of the instrument panel 41, and an upward deployment portion 28 capable of extending upwardly from a rear end of the knee protection portion 27, in its deployed state.

The knee protection portion 27 is disposed such that it is deployed from the casing 22 along the lower surface of the instrument panel 41, to cover a range from a position of the casing 22 to a rear edge of the instrument panel 41, in its deployed state. The knee protection portion 27 in its deployed state has a vehicle width directional dimension approximately equal to that of the driver seat 38, and disposed to overlap the steering shaft 32, when viewed in an up-down direction.

The upward deployment portion 28 comprises a left upward deployment section 28A and a right upward deployment section 28B. The left upward deployment section 28A is capable of being deployed to extend upwardly from a rear end of a left side region of the knee protection portion 27, via a left side of the steering shaft 32, and the right upward deployment section 28B is capable of being deployed to extend upwardly from a rear end of a right side region of the knee protection portion 27, via a right side of the steering shaft 32. Upper ends of the upward deployment sections 28A, 28B in their deployed states reach a height position approximately equal to that of an upper end of the steering wheel 30.

Figure 8:
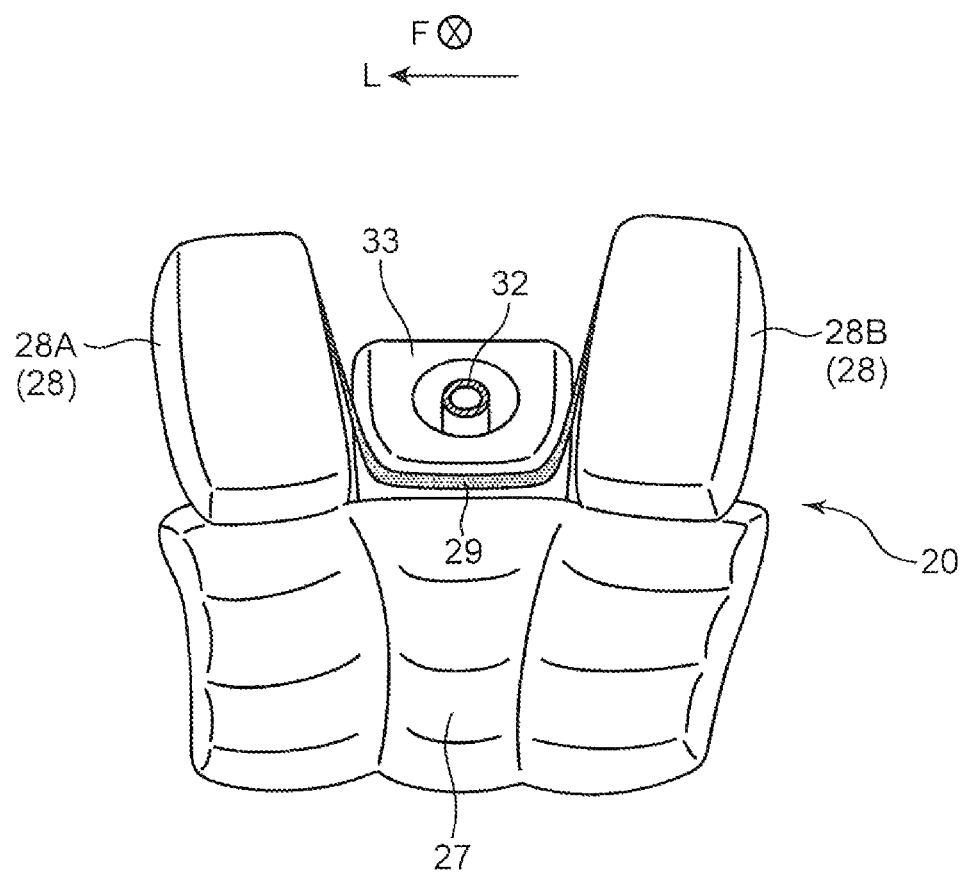
FIG. 8 is a rear sectional view depicting a state after the driver airbag is removed from FIG. 7.

The upper ends of the left and right upward deployment sections 28A, 28B are coupled together by a tether 29 (FIG. 8) extending in the vehicle width direction. When the upward deployment sections 28A, 28B are deployed upwardly, the tether 29 is also moved upwardly along with the upward deployment. However, the steering column 33 exists between the upward deployment sections 28A, 28B in their deployed states. Thus, the tether 29 is moved upwardly in a state in which a vehicle width directional central portion of the tether 29 is constrained (caught) by a lower surface of the steering column 33. As a result, a tension is generated in the tether 29, and the upper ends of the left and right upward deployment sections 28A, 28B are pulled inwardly in the vehicle width direction, i.e., in a direction causing the upper ends of the upward deployment sections 28A, 28B to come closer to the steering shaft 32, by the tension. In this way, the upper ends of the upward deployment sections 28A, 28B are pulled inwardly in the vehicle width direction (in a direction causing the upper ends of the upward deployment sections 28A, 28B to come closer to the steering shaft 32) by the tether 29, and thereby the upper ends of the upward deployment sections 28A, 28B are constrained, so that each of the upward deployment sections 28A, 28B is set at a given vehicle width directional position relatively close to the steering shaft 32. That is, the tether 29 functions as a "positioning device" for allowing each of the upward deployment sections 28A, 28B to be deployed and set at a given vehicle width directional position. Further, the steering column 33 is a component functioning as a "barrier" for stopping the vehicle width directional central portion of the tether 29 from being moved upwardly.

Although depiction is omitted, the vehicle is further provided with a curtain airbag configured to be deployed at least when an opponent object collides with the vehicle laterally (i.e., in the event of a lateral collision or side-impact collision). For example, the curtain airbag is provided inside the front pillars 6 and the roof side rails 7, and configured to be deployed downwardly in response to detection of a lateral collision.

Operations of the driver airbag 10 and the knee airbag 20 during an oblique collision of the vehicle will be described below. The following description will be made primarily on an assumption that an opponent object such as another vehicle or an obstacle collides with the own vehicle obliquely from a region of the front end of the own vehicle located on a side opposite to the driver seat 38 (i.e., obliquely from a right side of the front end), as depicted in FIG. 9.

Figure 9:
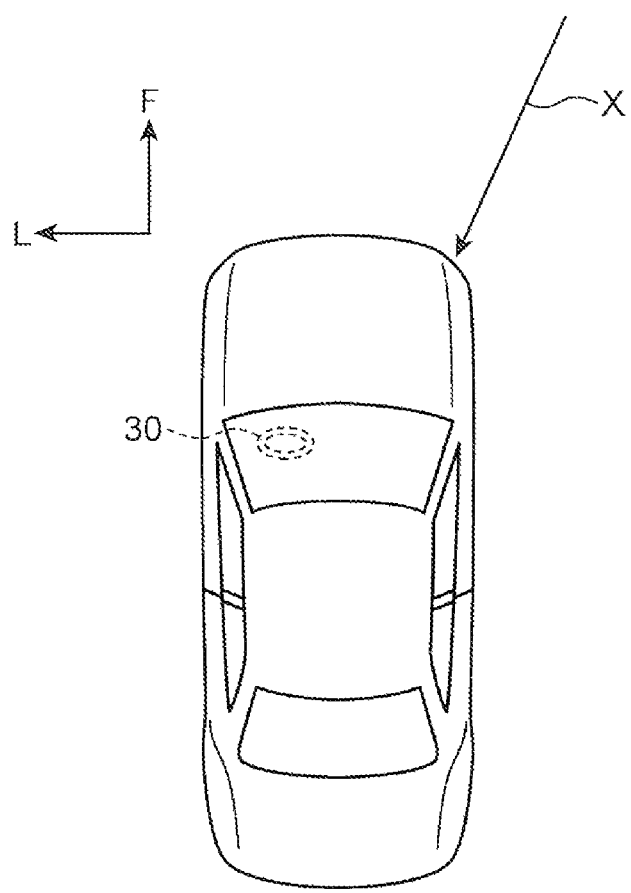
FIG. 9 is an explanatory diagram schematically depicting an oblique collision accident of a vehicle.
Figure 10:
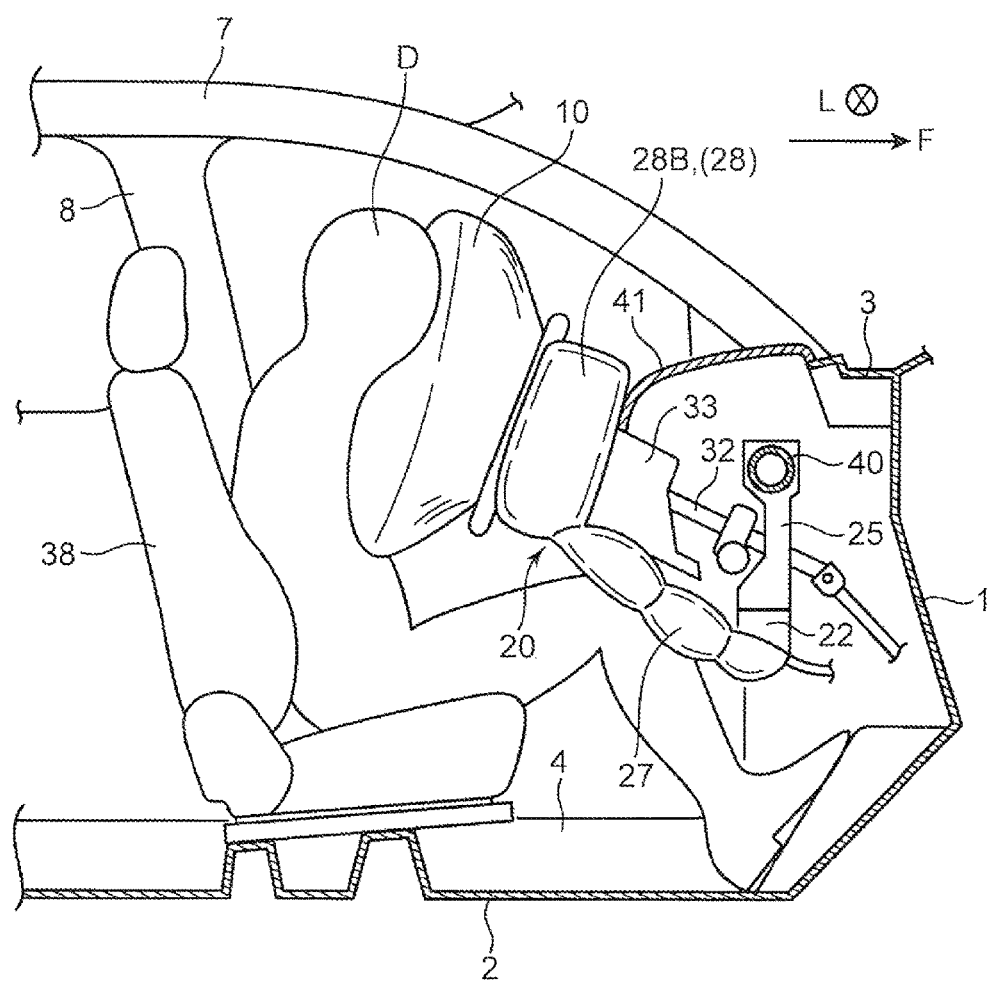
FIG. 10 is a explanatory side view illustrating an operation of this embodiment.
Figure 11:
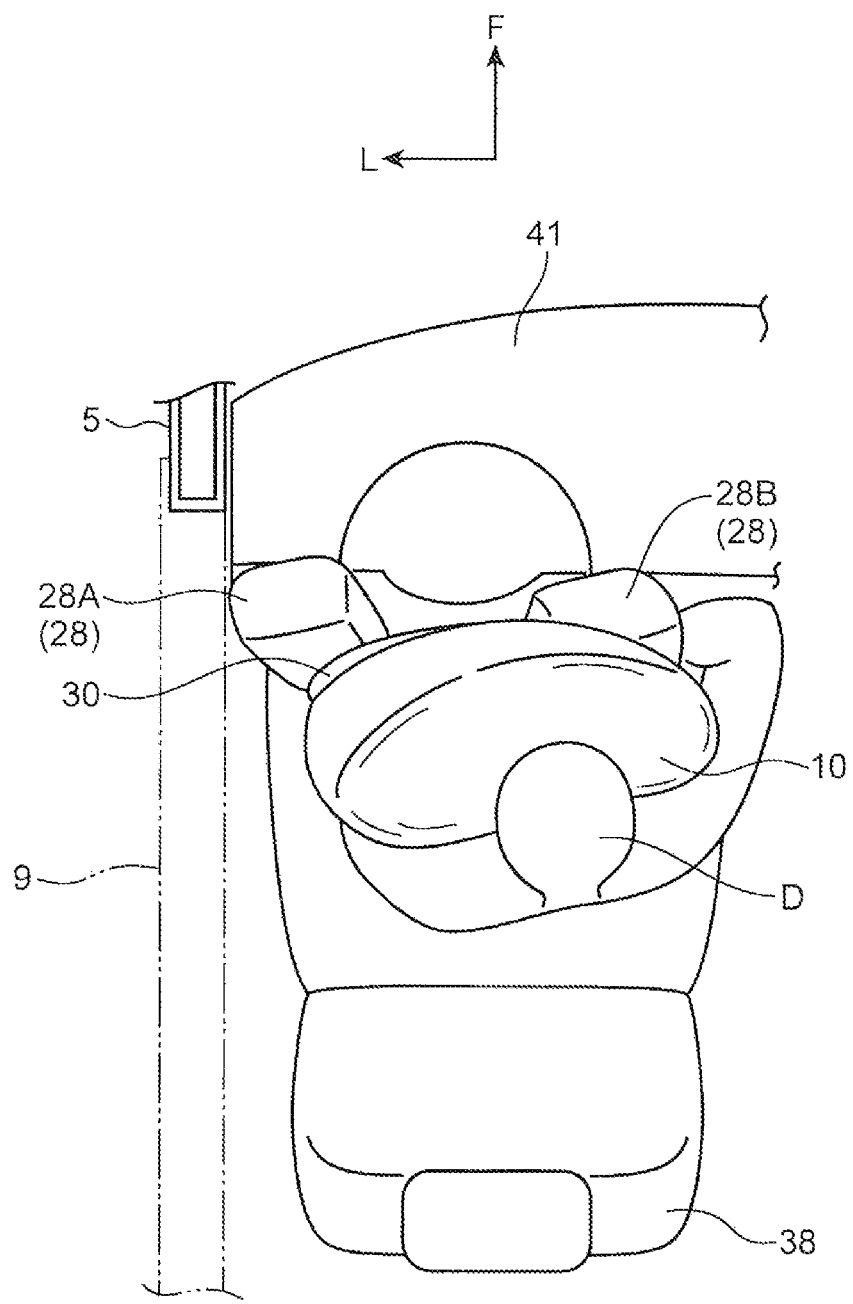
FIG. 11 is an explanatory top plan view illustrating the operation of this embodiment.

As depicted in FIG. 9, in the event of an oblique collision accident, an impact load X oriented obliquely rearwardly and leftwardly acts on the vehicle, and large acceleration occurs in the same direction as that of the impact load X. Then, this acceleration is detected by a non-depicted acceleration sensor provided on the vehicle, and, in response to the detection, the respective inflators 11, 21 of the driver airbag 10 and the knee airbag 20 are activated. Then, as depicted in FIGS. 10 and 11, along with operations of the inflators 11, 21, the driver airbag 10 is deployed rearwardly from the steering wheel 30 and simultaneously the knee airbag 20 is deployed rearwardly and upwardly from a position (casing 22) below the steering shaft 32.

The driver airbag 10 in its deployed state is disposed between the driver D and the steering wheel 30. Thus, the head region of the driver D pushed and moved obliquely forwardly (in this example, obliquely forwardly and rightwardly) under the impact load X arising from the collision is received by the driver airbag 10, thereby preventing the head region from colliding with the steering wheel 30 and others.

As already described, the knee airbag 20 in its deployed state comprises the knee protection portion 27 and the upward deployment portion 28 (the left upward deployment section 28A and the right upward deployment section 28B). That is, in the deployed state of the knee airbag 20, the knee protection portion 27 is formed in such a manner as to cover the lower surface of the instrument panel 41, and the pair of left and right upward deployment sections 28A, 28B are formed in such a manner as to extend upwardly from the rear end of the knee protection portion 27 along the rear surface of the instrument panel 41.

The knee protection portion 27 in its deployed state is disposed in front of the driver seat 38 to cover the lower surface of the instrument panel 41. Thus, as depicted in FIG. 10, a knee region of the driver D pushed and moved due to the impact during the oblique collision is received by the knee protection portion 27 to prevent the knee region from colliding with the lower surface of the instrument panel 41.

The left and right upward deployment sections 28A, 28B are deployed, respectively, via left and right sides of the steering shaft 32, and then set at respective given positions on the left and right sides of the steering shaft 32 by an action of the tether 29 (FIG. 8) provided between the upward deployment sections 28A, 28B. The left and right upward deployment sections 28A, 28B deployed and positioned in the above manner are disposed between a lateral portion of the driver airbag 10 deployed rearwardly from the steering wheel 30, and the instrument panel 41. That is, the left upward deployment section 28A is disposed between a left portion of the driver airbag 10 and the instrument panel 41, and the right upward deployment section 28B is disposed between a right portion of the driver airbag 10 and the instrument panel 41.

In many vehicles, a manual operation lever for operating a direction indicator and a manual operation lever for operating a wiper are installed on right and left sides of the steering column 33. The left and right upward deployment sections 28A, 28B are deployed in a region where there are such manual operation levers. However, the manual operation levers are broken by a force of the deployment, so that the deployment of the upward deployment sections 28A, 28B is never hindered by the manual operation levers.

As mentioned above, the airbag apparatus according to the above embodiment comprises the driver airbag 10 and the knee airbag 20. The knee airbag 20 comprises the upward deployment portion 28 (the left upward deployment section 28A and the right upward deployment section 28B) capable of, in its deployed state, extending upwardly via left and right side of the steering shaft 32, wherein each of the upward deployment sections 28A, 28B in their deployed states is disposed between a respective one of the left and right portions of the driver airbag 10 in its deployed state and the instrument panel 41. In the airbag apparatus having this feature, inclination and displacement of the driver airbag 10 are inhibited by the left upward deployment section 28A or the right upward deployment section 28B, so that it becomes possible to adequately receive the head region of the driver D by the driver airbag 10 to thereby effectively protect the driver D.

Figure 12:
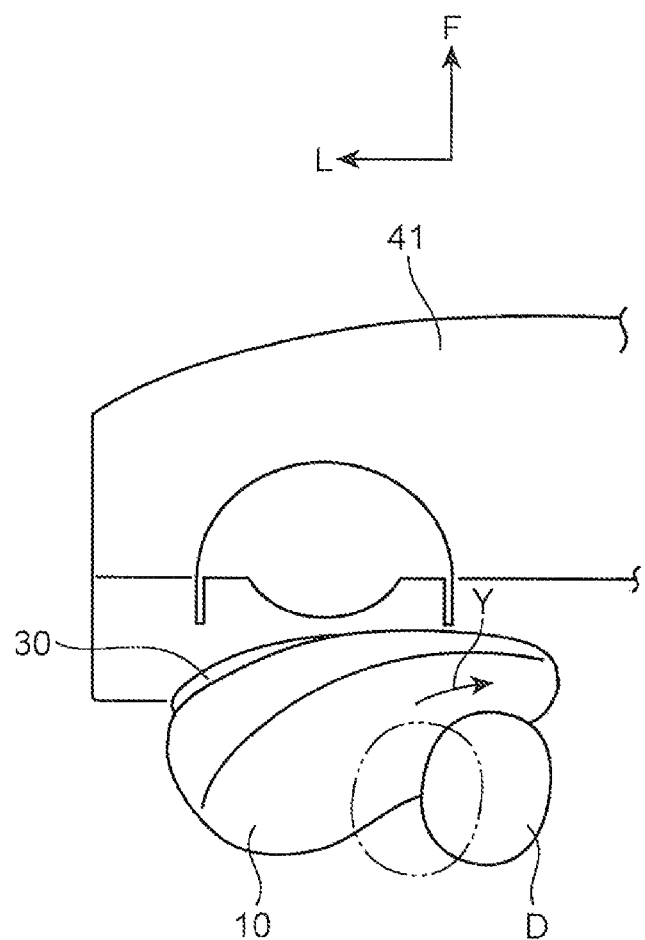
FIG. 12 is an explanatory diagram illustrating a comparative example with respect to the present invention.

For example, when an oblique collision accident as depicted in FIG. 9 (an oblique collision accident from a rightwardly offset position of a front end of a vehicle, i.e., from a laterally offset position on an opposite side of (farther away from) the driver D) occurs in a comparative example depicted in FIG. 12, wherein an airbag apparatus is devoid of the upward deployment sections 28A, 28B between the driver airbag 10 and the instrument panel 41, the head region of the driver D pushed and moved obliquely forwardly and rightwardly under the impact load X arising from the oblique collision hits against the rear surface of the driver airbag 10, so that the right portion of the driver airbag 10 is easily displaced forwardly, and the driver airbag 10 is displaced in a posture where the rear surface thereof is largely inclined to face inwardly in the vehicle width direction and rearwardly. Thus, the head region of the driver D is easily displaced inwardly in the vehicle width direction along the inclined rear surface of the driver airbag 10, as indicated by the arrowed line Y in FIG. 12. If the head region of the driver D is displaced in this direction, the driver airbag 10 becomes unable to receive the head region of the driver D with a sufficient force, resulting in insufficient restraint of the head region of the driver D. This means that it becomes impossible to adequately protect the driver D.

The above problem also occurs in the event of an oblique collision accident in which an impact load is input from a laterally offset position on the opposite side of that in FIG. 9 (i.e., an oblique collision accident from a leftwardly offset position of the front end, i.e., a laterally offset position closer to the driver D). Specifically, the head region of the driver D hits against the rear surface of the driver airbag 10 in an obliquely forward and leftward direction, so that the driver airbag 10 is inclined in a direction opposite to that in FIG. 12 (outwardly in the vehicle width direction), resulting in insufficient restraint of the head region of the driver D.

Differently from the above, the upward deployment sections 28A, 28B of the knee airbag 20 each deployed to fill a space between a respective one of the left and right sides of the driver airbag 10 and the instrument panel 41 make it possible to effectively inhibit the driver airbag 10 from being inclined as in the comparative example (FIG. 12). For example, in the event of an oblique collision from a rightwardly offset position of the front end (from a laterally offset position on an opposite side of (farther away from) the drive D), as depicted in FIG. 9, the right upward deployment section 28B deployed between the right portion of the driver airbag 10 and the instrument panel 41 can inhibit the right portion of the driver airbag 10 from being displaced forwardly, i.e., can inhibit the driver airbag 10 from being inclined inwardly in the vehicle width direction, as depicted in FIG. 11. On the other hand, in the event of an oblique collision from a laterally offset position on an opposite side of that in FIG. 9 (from a laterally offset position closer to the drive D), the left upward deployment section 28A deployed between the left portion of the driver airbag 10 and the instrument panel 41 can inhibit the left portion of the driver airbag 10 from being displaced forwardly, i.e., can inhibit the driver airbag 10 from being inclined outwardly in the vehicle width direction. As above, in the above embodiment, in the event of an oblique collision from either one of a rightwardly offset position and a leftwardly offset position of the front end of the vehicle, inclination and displacement of the driver airbag 10 are reliably inhibited by the left upward deployment section 28A or the right upward deployment section 28B, so that it becomes possible to absorb an impact while receiving the head region of the driver D with a sufficient force, thereby achieving adequate protection of the driver D during the oblique collision of the vehicle.

In the above embodiment, the left and right upward deployment sections 28A, 28B are constructed by a part of the knee airbag 20 for protecting the knee region of the driver D. That is, the knee airbag 20 comprises the knee protection portion 27 configured to be deployed to cover the lower surface of the instrument panel 41, and the left and right upward deployment sections 28A, 28B configured to be deployed to extend upwardly from the knee protection portion 27. In the airbag apparatus having this feature, the knee airbag 20 can be deployed to simultaneously realize a function of protecting the knee region of the driver D from colliding with the lower surface of the instrument panel 41, and a function of inhibiting inclination and displacement of the driver airbag 10. It also becomes possible to provide a simplified structure as compared to the case where two separate airbags are deployed to realize the two functions.

In the above embodiment, the tether 29 is provided between respective upper ends of the left and right upward deployment sections 28A, 28B in such a manner as to couple respective upper ends of the upward deployment sections 28A, 28B together, and, during deployment of the knee airbag 20, the vehicle width directional central portion of the tether 29 is caught by the lower surface of the steering column 33 to thereby stop upward movement of the central portion. Then, based on a tension of the tether 29 generated along with the deployment, the upward deployment sections 28A, 28B are set at given positions on the right and left sides of the steering shaft 32. In the airbag apparatus having this feature, with a simple structure in which the tether 29 is provided between the left and right upward deployment sections 28A, 28B, the upward deployment sections 28A, 28B can be set at given positions to thereby reliably inhibit inclination and displacement of the driver airbag 10. In addition, the tension is generated in the tether 29 by utilizing the steering column 33 as an existing component, so that it becomes possible to provide a rational and low-cost structure.

In the above embodiment, the left upward deployment section 28A deployable on a left side of the steering shaft 32, and the right upward deployment section 28B deployable on a right side of the steering shaft 32, are provided. However, one of them may be omitted. For example, it is conceivable to omit the left upward deployment section 28A located on a side closer to a lateral wall of the passenger compartment (located outwardly in the vehicle width direction). In this case, for example, a shape of a curtain airbag configured to be deployed from the front pillar 6 or the roof side rail 7 may be appropriately modified to realize the same function as that of the left upward deployment section 28A based on the modified curtain airbag. More specifically, the curtain airbag may be configured such that a part thereof is deployed toward the left side of the steering shaft 32 (a space between the left side of the driver airbag 10 and the instrument panel 41). This makes it possible to inhibit the driver airbag 10 from being inclined outwardly in the vehicle width direction. Alternatively, it is conceivable to omit the right upward deployment section 28B located on a side farther away from to the lateral wall of the passenger compartment (located inwardly in the vehicle width direction). However, besides the knee airbag, there is not any airbag capable of being deployed in the vicinity of the right side of the driver airbag 10. Therefore, it is considered that there is relatively severe difficulty in realizing the same function as that of the right upward deployment section 28B by utilizing another airbag. Considering the above, the upward deployment portion in the present invention preferably comprises a portion capable of being deployed via a vehicle width directionally inward one of opposite lateral sides of the steering shaft (a portion equivalent to the right upward deployment section 28B).

Although the above embodiment has been described based on an example where the present invention is applied to a left-hand drive vehicle in which the steering wheel 30 is provided on the left side of the passenger compartment, it is to be understood that the present invention may also be applied to a right-hand drive vehicle.

Last of all, distinctive features of the airbag apparatus disclosed in the above embodiment and functions/advantageous effects based on the features will be outlined.

An airbag apparatus according to the above embodiment is designed for use in a vehicle to protect an occupant (driver), wherein the vehicle includes an instrument panel and a steering wheel provided on a rear side of the instrument panel. The airbag apparatus comprises: a first airbag provided in the steering wheel and configured to be deployed rearwardly from the steering wheel during an oblique collision of the vehicle; and a second airbag provided at a position below a steering shaft extending forwardly from the steering wheel, and configured to be deployed rearwardly and upwardly from the position during the oblique collision of the vehicle. The second airbag comprises an upward deployment portion capable of, in its deployed state, extending upwardly via a lateral side of the steering shaft, wherein the upward deployment portion is disposed between a lateral portion of the first airbag in its deployed state and the instrument panel.

In the above airbag apparatus, during an oblique collision of a vehicle, the first airbag is deployed from the steering wheel; and the second airbag is developed from the position below a steering shaft, and the upward deployment portion of the second air bag is disposed between a lateral portion of the first airbag and the instrument panel, so that the upward deployment portion can effectively inhibit the lateral portion of the first airbag from being displaced forwardly. Thus, even when a head region of a driver hits the first airbag in an obliquely forward direction, under an impact load arising from an oblique collision, inclination and displacement of the first airbag are inhibited, so that it becomes possible to receive the head region of the driver with a sufficient force, thereby achieving adequate protection of the driver during the oblique collision of the vehicle.

Preferably, the second airbag further comprises a knee protection portion capable of being spread in its deployed state to cover a lower surface of the instrument panel.

In the airbag apparatus having this feature, the second airbag comprising the upward deployment portion and the knee protection portion can be deployed to simultaneously realize a function of protecting a knee region of the driver from colliding with the lower surface of the instrument panel, and a function of inhibiting inclination and displacement of the driver airbag. It also becomes possible to provide a simplified structure as compared to the case where two separate airbags are deployed to realize the two functions.

Preferably, the second airbag further comprises a positioning device for allowing the upward deployment portion to be deployed and set at a given vehicle width directional position along a rear surface of the instrument panel.

The airbag apparatus having this feature can stabilize a position of the upward deployment portion in its deployed state, thereby reliably bringing out the aforementioned first airbag inclination inhibiting effect.

Preferably, the positioning device is a tether capable of, in the deployed state of the second airbag, generating a vehicle width directional tension acting to pull an upper end of the upward deployment portion toward the steering shaft.

The airbag apparatus having this feature can position the upward deployment portion in a simple and reliable manner by means of a tension generated by the tether.

Preferably, the upward deployment portion comprises a left upward deployment section deployable on a left side of the steering shaft, and a right upward deployment section deployable on a right side of the steering shaft, wherein the tether is provided to couple respective upper ends of the left upward deployment section and the right upward deployment section together, and a component around the steering shaft functions as a barrier for stopping a vehicle width directional central portion of the tether from being moved upwardly.

In the airbag apparatus having this feature, the upward deployment portion (the left upward deployment section and the right upward deployment section) are disposed on right and left sides of the steering shaft. Thus, in the event of an oblique collision from a rightwardly offset position of a front end of the vehicle and in the event of an oblique collision from a leftwardly offset position of a front end of the vehicle, it becomes possible to reliably inhibit inclination and displacement of the first airbag, respectively, by the right upward deployment section and the left upward deployment section. Further, the upward movement of the central portion of the tether coupling the upper ends of the left and right upward deployment sections together is inhibited by a component (barrier) around the steering shaft, and thereby a tension is reliably generated in the tether, so that it becomes possible to inhibit the left and right upward deployment sections from being displaced in a direction causing the upward deployment sections to move away from each other, thereby allowing the upward deployment sections to be reliably set at desired given positions.

This application is based on Japanese Patent application No. 2015-034412 filed in Japan Patent Office on Feb. 24, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An airbag apparatus for use in a vehicle to protect an occupant, wherein the vehicle includes an instrument panel and a steering wheel provided on a rear side of the instrument panel, the airbag apparatus comprising:
   a first airbag provided in the steering wheel and configured to be deployed rearwardly from the steering wheel during an oblique collision of the vehicle; and
   a second airbag provided at a position below a steering shaft extending forwardly from the steering wheel, and configured to be deployed rearwardly and upwardly from the position during the oblique collision of the vehicle,
   wherein the second airbag comprises an upward deployment portion capable of, in its deployed state, extending upwardly via a lateral side of the steering shaft, the upward deployment portion being disposed between a lateral portion of the first airbag in its deployed state and the instrument panel,
      wherein, in the deployed state of the second airbag, a tether of the second airbag generates a vehicle width directional tension acting to pull an upper end of the upward deployment portion toward the steering shaft.

2. The airbag apparatus as recited in claim 1, wherein the second airbag further comprises a knee protection portion capable of being spread in its deployed state to cover a lower surface of the instrument panel.

3. The airbag apparatus as recited in claim 1, wherein the upward deployment portion comprises a left upward deployment section deployable on a left side of the steering shaft, and a right upward deployment section deployable on a right side of the steering shaft, and wherein
   the tether is provided to couple respective upper ends of the left upward deployment section and the right upward deployment section together, and
   a component around the steering shaft functions as a barrier for stopping a vehicle width directional central portion of the tether from being moved upwardly.

4. The airbag apparatus as recited in claim 1, wherein the upward deployment portion includes a left upward deployment section deployable on a left side of the steering shaft, and a right upward deployment section deployable on a right side of the steering shaft, and wherein a positioning device is provided to couple the left upward deployment section and the right upward deployment section together.

5. The airbag apparatus as recited in claim 1, wherein the upward deployment portion includes a left upward deployment section deployable on a left side of the steering shaft, and a right upward deployment section deployable on a right side of the steering shaft, and wherein the tether is provided to couple the left upward deployment section and the right upward deployment section together.

6. An airbag apparatus for use in a vehicle to protect an occupant, wherein the vehicle includes an instrument panel and a steering wheel provided on a rear side of the instrument panel, the airbag apparatus comprising:
   a first airbag provided in the steering wheel and configured to be deployed rearwardly from the steering wheel during an oblique collision of the vehicle; and
   a second airbag provided at a position below a steering shaft extending forwardly from the steering wheel, and configured to be deployed rearwardly and upwardly from the position during the oblique collision of the vehicle,
   wherein the second airbag includes an upward deployment portion capable of, in its deployed state, extending upwardly via a lateral side of the steering shaft, the upward deployment portion being disposed between a lateral portion of the first airbag in its deployed state and the instrument panel,
   the second airbag further includes a positioning device for allowing the upward deployment portion to be deployed and set at a given vehicle width directional position along a rear surface of the instrument panel,
   wherein the positioning device is a tether capable of, in the deployed state of the second airbag, generating a vehicle width directional tension acting to pull an upper end of the upward deployment portion toward the steering shaft.

7. The airbag apparatus as recited in claim 6, wherein the upward deployment portion comprises a left upward deployment section deployable on a left side of the steering shaft, and a right upward deployment section deployable on a right side of the steering shaft, and wherein
   the tether is provided to couple respective upper ends of the left upward deployment section and the right upward deployment section together, and
   a component around the steering shaft functions as a barrier for stopping a vehicle width directional central portion of the tether from being moved upwardly.

8. An airbag apparatus for use in a vehicle to protect an occupant, wherein the vehicle includes an instrument panel and a steering wheel provided on a rear side of the instrument panel, the airbag apparatus comprising:
   a first airbag provided in the steering wheel and configured to be deployed rearwardly from the steering wheel during an oblique collision of the vehicle; and
   a second airbag provided at a position below a steering shaft extending forwardly from the steering wheel, and configured to be deployed rearwardly and upwardly from the position during the oblique collision of the vehicle,
   wherein the second airbag includes an upward deployment portion capable of, in its deployed state, extending upwardly via a lateral side of the steering shaft, the upward deployment portion being disposed between a lateral portion of the first airbag in its deployed state and the instrument panel,
   wherein the second airbag includes a positioning device for allowing the upward deployment portion to be deployed and set at a given vehicle width directional position,
   wherein, in the deployed state of the second airbag, the positioning device is located on the upward deployment portion at an upper portion located above the steering shaft towards the steering shaft.

9. The airbag apparatus as recited in claim 8, wherein, in the deployed state of the second airbag, the positioning device is a tether that generates a vehicle width directional tension acting to pull the upper portion.

* * * * *